United States Patent [19]
Greatbatch

[11] 3,836,798
[45] Sept. 17, 1974

[54] DEVICE FOR CONVERTING NUCLEAR ENERGY INTO ELECTRICAL ENERGY

[75] Inventor: Wilson Greatbatch, Clarence, N.Y.

[73] Assignee: Wilson Greatbatch, Ltd., Clarence, N.Y.

[22] Filed: Aug. 15, 1972

[21] Appl. No.: 280,844

Related U.S. Application Data

[63] Continuation of Ser. No. 36,182, May 11, 1970, abandoned.

[52] U.S. Cl. .............................. 310/3 B, 128/419 P
[51] Int. Cl. ............................................. G21d 7/00
[58] Field of Search............ 310/3 B, 3 D; 128/391, 128/421, 422, 419 P

[56] References Cited
UNITED STATES PATENTS

| | | | |
|---|---|---|---|
| 2,847,585 | 8/1958 | Christian | 310/3 |
| 2,952,817 | 9/1960 | Kennedy | 310/3 B |
| 2,998,550 | 8/1961 | Collins et al. | 310/3 B |
| 3,011,096 | 11/1961 | Wallack et al. | 310/3 |
| 3,645,267 | 2/1972 | Hagfors | 128/421 |

FOREIGN PATENTS OR APPLICATIONS

| | | | |
|---|---|---|---|
| 1,055,144 | 2/1957 | Germany | 310/3 B |
| 761,404 | 11/1956 | Great Britain | 310/3 B |

OTHER PUBLICATIONS

Popular Mechanics, Sept. 1970, "Atomic Power to Keep Your Heart Beating," by Freese, pp. 104–107, 214.

Coleman, "Nuclear Batteries" 1/15/53, pp. 1–2, Signal Corps Project under RRC. AD–16261, 7/15/53, pp. 23–26, 33, 36–40.

*Primary Examiner*—Harvey E. Behrend
*Attorney, Agent, or Firm*—Christel & Bean

[57] ABSTRACT

A device for converting nuclear energy into electrical energy comprising a radioactive nuclide, preferably a core of lithium enveloped by a coating of lithium hydride, an energy converting material enveloping the nuclide, and a pair of terminals connected in the converting material. The converting material preferably comprises silicon having diffused therein impurities of p-type and n-type material thereby defining opposite conductivity regions separated by a junction. The terminals are connected to corresponding ones of the regions, and electron-hole pairs are created in the regions upon bombardment by beta particles from the nuclide thereby creating a flow of current across the junction and an electrical potential across the terminals. The device advantageously can be utilized in conjunction with an artificial cardiac pacemaker whereby the stimulating pacemaker output pulses are generated at a non-linear rate.

3 Claims, 3 Drawing Figures

PATENTED SEP 17 1974   3,836,798

INVENTOR.
Wilson Greatbatch
BY
Christel & Bean
ATTORNEYS.

DEVICE FOR CONVERTING NUCLEAR ENERGY INTO ELECTRICAL ENERGY

This is a continuation, division, of application Ser. No. 36,182 filed May 11, 1970, now abandoned.

BACKGROUND OF THE INVENTION

The present invention relates to the direct conversion of nuclear to electrical energy, and more particularly, to a nuclear-powered electrical supply for an artificial cardiac pacemaker.

The employment of nuclear energy in a low power electrical battery is desirable and attractive for providing electrical power safely to inaccessible devices in the human environment. Among the materials considered for such conversion are plutonium 238 having a half-life of 89 years, promethium 147 having a half-life of 2.5 years, and tritium 3 having a half-life of 12 years. As plutonium undergoes radioactive disintegration, it emits alpha particles, i.e., dipositive helium atoms, and therefore is suitable only for thermoelectric conversion wherein the energy released as a result of the disintegration produces heat which in turn, must be converted to electrical energy. Promethium and tritium, on the other hand, emit beta particles, i.e., electrons, during disintegration and are suitable for direct conversion wherein a converter material when bombarded by the beta particles creates a potential difference. In addition, radioactive elements, such as tritium, decay at a non-linear rate, and it would be advantageous to employ this characteristic in providing a desired control function.

One area of use of the present invention is in providing a beta voltaic battery for supplying electrical power to an artificial cardiac pacemaker and, in addition, for supplying that power at a changing rate during a given period. The radioactive element or isotope selected as the active component of such a battery must have a half-life corresponding to the patient's physiological or medical requirements, as well as to the expected life of the artificial pacemaker. The radioactive element or isotope must be of the type which is feasible and economical to manufacture, relatively safe, and capable of being carried by a patient either external to or implanted in his body. In addition, the battery must be sealed or contained in a manner which does not interfere with battery operation yet which protects the patient from any harmful substances emitted during the nuclear disintegration.

SUMMARY OF THE INVENTION

It is, therefore, an object of this invention to provide an improved electrical power source wherein nuclear energy is converted directly to electrical energy which source is capable of powering electrical devices safely in the human environment.

It is a further object of this invention to provide such an electrical power source wherein the radioactive element or isotope employed therein decays at a non-linear rate whereby this characteristic can be utilized to provide a desired control function.

It is a more particular object of this invention to provide such an electrical power supply for an artificial cardiac pacemaker, which supply can be safely carried by a patient either external to or implanted in his body.

It is a more particular object of this invention to provide a beta voltaic battery functioning as a timing element to vary the rate of stimulating pulses in a pediatric artificial cardiac pacemaker during the patient's child growth period.

The present invention provides a device for converting nuclear energy into electrical energy including a radioactive nuclide which emits beta particles during radioactive decay. The decay preferably is non-linear or logarithmic whereby the device can provide a control function in addition to supplying electrical energy. An energy converting material also is included which upon being bombarded by the emitted beta particles gives rise to an electrical potential difference.

The foregoing and additional advantages and characterizing features of the present invention will become clearly apparent upon a reading of the ensuing detailed description together with the included drawings wherein:

BRIEF DESCRIPTION OF THE DRAWING FIGURES

DETAILED DESCRIPTION OF THE ILLUSTRATED EMBODIMENT

Figure 1:
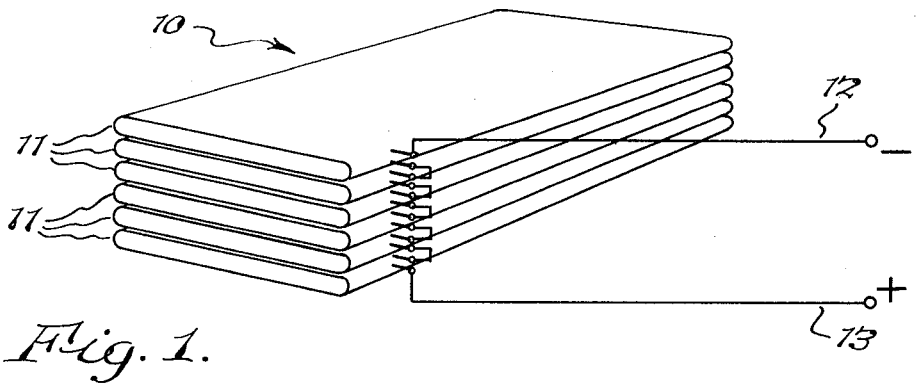
FIG. 1 is a perspective view showing a preferred form of nuclear powered battery according to the present invention comprising a plurality of slabs arranged in a stack and electrically connected in series.

The present invention will be described with particular reference to a device utilizing nuclear energy to supply electrical power to, and control the rate of pulse generation in, an artificial cardiac pacemaker, although the principles of the invention can be variously applied. An example of the operating requirements imposed on such a battery is seen in a pediatric artificial cardiac pacemaker which when initially implanted in a one year old child might well have a pulse generation rate of about 90 beats per minute, and which rate should be decreased at an average rate of about one beat per minute per year, so that by the time the patient reaches age 20 the heart rate is reduced to about 70 beats per minute. A nuclear powered battery including a radioactive nuclide such as tritium with a half-life of 12 years could serve as the timing element to reduce the available voltage to the pacemaker circuit over two half-lives of the fuel or radioactive nuclide.

The optimum radioactive nuclide for such a pulse rate controller should have a half-life of probably not less than half of the expected life of the device. For example, an artificial cardiac pacemaker having an expected life of 20 years should be controlled by a radioactive nuclide having a half-life of not less than 10 years. Otherwise, the ratio of BOL emission to EOL emission might be so large as to considerably complicate the overall system. Tritium, having a half-life of 12 years, thus satisfies this requirement.

In most instances where a pediatric cardiac pacemaker is employed, the decrease in the rate of pulse generation probably should not be linear, but rather should be accelerated during the child's initial years. In other words, the heart rate should decrease relatively rapidly from the initial rate of 90 beats per minute as the child increases in age from age one, and should approach 70 beats per minute relatively gradually as the patient increases in age further toward age 20. Tritium is known to undergo radioactive disintegration or decay at a logarithmic rate and therefore satisfies this requirement.

The present invention contemplates, therefore, a pulse generator frequency determining means which utilizes the radioactive decay or disintegration of a radioactive nuclide material to provide a stable and reliable reduction or decrease in the output pulse rate during one or more half-lives of the nuclide. In employing the pulse generator frequency determining means of the present invention in conjunction with an artificial cardiac pacemaker, it is necessary only to include in the pacemaker a pulse generator providing an output pulse rate which is a direct function of the applied voltage. For example, in existing cardiac pacemaker circuits including a blocking oscillator, the time-decreasing supply voltage can be applied to the base resistor of the blocking oscillator while the voltage-regulated power supply voltages are applied to other parts of the circuit.

Because tritium has a half-life of 12 years and a logarithmic decay or disintegration characteristic, it would appear to be an optimum material for such a beta voltaic battery. Being an isotope of hydrogen, however, tritium is a gas and nearly a litre of tritium would be required to generate 50 microwatts of power. Converting the gaseous tritium into its liquid or solid form would greatly decrease the volume of tritium required to provide an equivalent amount of electrical power. For example, the weight of a litre of tritium is about 0.25 grams and in the form of heavy-heavy water would have a weight of 2.25 grams (0.25 grams of tritium and 2 grams of oxygen) and a volume of about 2.2 cubic centimeters.

Using tritium in the liquid form of heavy-heavy water while desirably requiring a smaller volume can result in an undesirable reaction with the material which must be present to convert beta emissions to a potential difference. This converter material and its relation to the rest of the device will be described in more detail hereafter. Another factor to be considered is the loss of energy when beta electrons travel through various mediums; for example, most of the energy is lost upon traveling a distance of 1 centimeter in air, about 1 millimeter in salt or about 1 mil in metal. It is also known that an efficiency loss of nearly a factor of one-half results with the highly energetic promethium beta electrons when the material thickness is increased from 1 milligram per square centimeter to 6.5 milligrams per square centimeter.

Tritium in solid form would appear to be preferred as the radioactive nuclide material in the device of the present invention. The three stable salts of tritium are lithium hydride (LiH), lithium borohydride (LiBH$_4$) and copper hydride (CuH). Copper hydride has a relatively heavy nucleus, and thus would appear to be substantially opaque to the relatively low energy tritium beta electrons. Lithium borohydride although containing about 40 percent by weight of tritium at present is difficult to manufacture. Lithium hydride, on the other hand, is relatively easy to make and has a tritium content of about 30 percent by weight.

FIG. 1 shows a beta voltaic pile 10, comprising a series of stacked, series-connected slabs 11 constructed in accordance with the present invention. Each slab 11 is provided with positive and negative polarity electrodes, and in the present illustration output leads 12 and 13 are connected to the corresponding negative and positive terminals, respectively, of the uppermost and lowermost slabs 11 of pile 10. A beta voltaic pile such as that shown at 10 in FIG. 1 can deliver a voltage between terminals 12 and 13 of up to about 2.5 volts at 25 microamperes.

Figure 2:
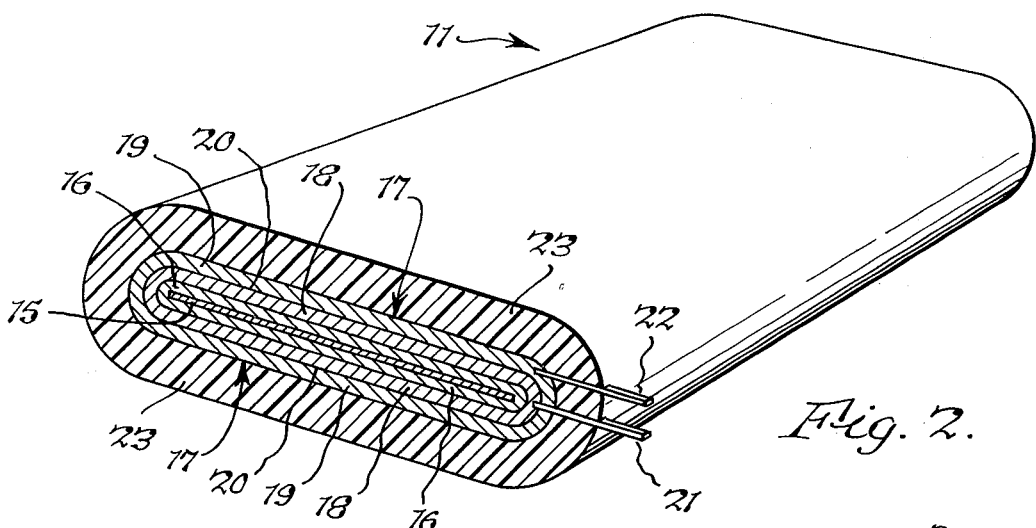
FIG. 2 is a cross-sectional view of a preferred form of one of the slabs included in the battery of FIG. 1.

FIG. 2 shows in detail a preferred construction of each slab 11 and illustrates the manner of fabricating the same. Slab 11 comprises a base 15 of pure lithium metal. In preferred form base 15 is formed from pure lithium foil rolled under kerosene to a thickness of about 10/1000th of an inch, the surface dimensions being about 1 inch long by ½ inch wide. Slab 11 further comprises a radioactive nuclide coating 16 overlying both surfaces of base 15. Coating 16 is formed of lithium hydride by exposing base 15 to tritium at a temperature of about 1,000° F. until a suitable thickness of lithium hydride forms on each side of base 15. The thickness of coating 16 is selected to optimize the radiation of beta electrons from the surface and subsurface, but not to suppress completely the radiation from deep-lying layers. In addition, coating 16 should be sufficiently thin so as to leave a supporting core of pure lithium metal.

Slab 11 further comprises a surface coating 17 of material for converting beta particles or electrons emitted from the radioactive nuclide to an electrical potential difference. Surface coating 17 preferably is formed of silicon, vacuum deposited by known techniques over each side of the radioactive nuclide. Surface coating 17 is provided with p-type and n-type impurities diffused by known techniques into the silicon at a relatively lower temperature, so as not to affect the hydride layers 16, thereby forming a p-type region or layer 18 and an n-type region or layer 19 separated by p-n junction interface 20. Surface coating 17 should be of a thickness sufficient to absorb substantially all of the beta electrons emitted but not so thick as to add unnecessary bulk. A first electrode 21 is suitably connected with the p-type material, and an electrode 22 is suitably connected with the n-type material. Both electrodes 21 and 22 are externally exposed for electrical connection to adjacent slabs in pile 10 or to either of the leads 12, 13 in the case of the uppermost and lowermost slabs.

Slab 11 is completely enclosed by a seal 23 of a material capable of containing tritium released by operation of the device. In particular, the beta bombardment of the bulk will result in some collisions with hydride atoms, thereby releasing free tritium. When the device of the present invention is used in a cardiac pacemaker, the tritium definitely must be contained because it is dangerous when free in the bloodstream. As tritium decays, one of the two neutrons in the nucleus emits a 19 k.e.v. electron leaving a second proton. Tritium thus decays transmutationally to helium which is stable and inert. Therefore, a preferable material for seal 23 is a glass ($SiO_2$) selected to pass helium but to contain hydrogen. In addition, it might be desirable to introduce a material, such as palladium metal, in slab 11 to adsorb, absorb or combine with the tritium to physically immobilize it. It is necessary to vent the innocuous helium because if all of the liberated gas is contained, pressures of up to 300 to 600 atmospheres eventually can be expected. Alternatively, palladium or other substances might be used for seal 23 as a helium "window."

In operation, beta electrons liberated from the radionuclide by disintegration thereof enter surface coating 17 creating hole-electron pairs therein by virtue of the resulting collisions. A flow of current arises developing a potential difference across junction 20 in a manner similar to the creation of a potential difference across p-n junctions. This same potential difference appears across electrodes 21 and 22 of each slab 11, and the sum of the potential differences of all the slabs 11 is available between leads 13 and 13 of pile 10. In addition, the magnitude of the potential difference will decrease with time at a logarithmic rate because of the logarithmic disintegration or decay characteristic of tritium.

Figure 3:
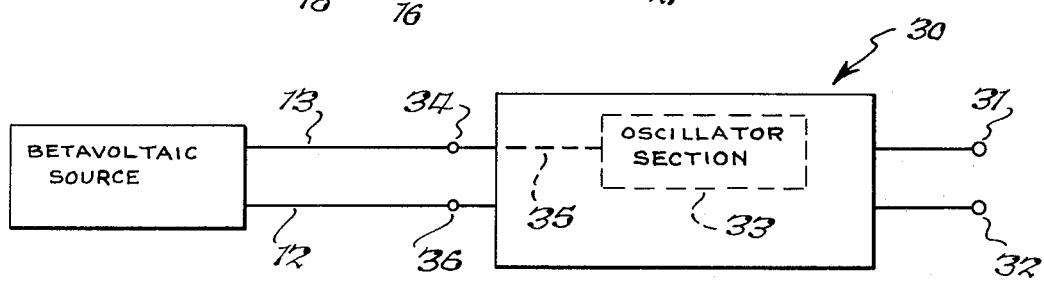
FIG. 3 is a block diagram showing the battery of the present invention with an artificial cardiac pacemaker.

The beta voltaic battery 10 of the present invention can be employed to power and determine the frequency of pulse generation in an artificial cardiac pacemaker, for example the pacemaker indicated generally at 30 in FIG. 3. Pacemaker 30 includes, briefly, a stimulating electrode 31 which is placed surgically in contact with a patient's heart and a reference or indifferent electrode 32 which usually is subcutaneously implanted at another part of the patient's body. In employing battery 10 of the present invention, it is necessary only that pacemaker 30 include a pulse generator providing an output pulse rate which is a direct function of the applied voltage. Pacemaker 30 of the present illustration is typical of existing pacemaker circuits including a blocking oscillator, the oscillator section being indicated at 33 in FIG. 3. In this pacemaker circuit is suffices to apply the time-decreasing supply voltage available on lead 13 of battery 10 through pacemaker input terminal 34 to the base resistor of the blocking oscillator, as indicated by the dashed line 35. This same time-decreasing supply voltage also is applied to the other parts of the pacemaker circuit as indicated by the connection of lead 13 to input terminal 34. The other lead 12 from battery 10 is connected to the other pacemaker input terminal. As a result, pacemaker 30 provides stimulating pulses at electrode 31 at a rate which is a direct function of the applied voltage from battery 10, and of particular interest is the employment of battery 10 with a pediatric atrificial pacemaker which is desired to provide a gradually decreasing rate of pulse generation during the child's growth period.

It is therefore apparent that the present invention accomplishes its intended objects. While a single specific embodiment of the present invention has been described in detail, this has been done by way of illustration without thought of limitation.

I claim:

1. A device for converting nuclear energy into electrical energy for use in an artificial cardiac pacemaker including an oscillator whereby stimulating pacemaker output pulses are generated at a non-linear rate, said device comprising:
   a. a radioactive nuclide comprising lithium tritide;
   b. semiconductive energy converting material enveloping said radioactive nuclide, said material having opposite conductivity regions meeting at a junction interface having a characteristic that electron-hole pairs are created in said regions upon bombardment by beta particles from said nuclide;
   c. a pair of terminals, each being connected to a corresponding side of the junction interface in said energy converting material whereby an electrical potential appears across said terminals in response to the flow of current across said junction; and
   d. means operatively connecting one of said terminals to the oscillator of said artificial cardiac pacemaker.

2. A device according to claim 1 wherein said radioactive nuclide comprises a core of lithium enveloped by a coating of lithium hydride.

3. A device according to claim 1 further comprising a protective seal enveloping said energy converting material, said seal comprising material capable of venting helium while containing hydrogen gas.

* * * * *